US012789635B2

(12) United States Patent
Kunze et al.

(10) Patent No.: US 12,789,635 B2
(45) Date of Patent: Nov. 10, 2026

(54) CURRENT COLLECTOR SYSTEM AND METHOD

(71) Applicant: Stemmann-Technik GmbH, Schüttorf (DE)

(72) Inventors: Jens Kunze, Gronau (DE); Michael Korte, Wietmarschen (DE)

(73) Assignee: Stemmann-Technik GmbH, Schüttorf (DE)

( * ) Notice: Subject to any disclaimer, the term of this patent is extended or adjusted under 35 U.S.C. 154(b) by 354 days.

(21) Appl. No.: 18/026,380

(22) PCT Filed: Mar. 25, 2022

(86) PCT No.: PCT/DE2022/100227
§ 371 (c)(1),
(2) Date: Mar. 15, 2023

(87) PCT Pub. No.: WO2022/199759
PCT Pub. Date: Sep. 29, 2022

(65) Prior Publication Data

US 2024/0294072 A1 Sep. 5, 2024

(30) Foreign Application Priority Data

Mar. 26, 2021 (DE) ......................... 102021107676.5

(51) Int. Cl.
*B60L 5/30* (2006.01)
*B60L 5/16* (2006.01)
(Continued)

(52) U.S. Cl.
CPC .................. *B60L 5/30* (2013.01); *B60L 5/16* (2013.01); *B60L 5/19* (2013.01); *B60L 5/22* (2013.01);
(Continued)

(58) Field of Classification Search
CPC ...... B60L 5/30; B60L 5/24; B60L 5/16; B60L 5/19; B60L 5/22; B60L 5/28; B60L 2200/36
(Continued)

(56) References Cited

U.S. PATENT DOCUMENTS 4,413,710 A * 11/1983 Milleville ................ B60L 5/28
191/88
2003/0159900 A1* 8/2003 Wilpsbaumer ............ B60L 5/32
191/45 R
(Continued)

FOREIGN PATENT DOCUMENTS

CN 205440002 U 8/2016
CN 111532140 A * 8/2020 ................ B60L 5/32
(Continued)

OTHER PUBLICATIONS

International Search Report and Written Opinion of the International Searching Authority for PCT/DE2022/100227 (16 pages).

*Primary Examiner* — S. Joseph Morano
*Assistant Examiner* — James William Jones
(74) *Attorney, Agent, or Firm* — K&L Gates LLP

(57) ABSTRACT

Embodiments of the inventive subject matter relate to a current collector that includes a vehicle-mounted base frame and including a lower scissor fastened on the base frame and an upper scissor fastened on the lower scissor with respective steering rods and includes a current collector rocker fastened on the upper scissor that includes contact strips for contacting an energized overhead line. A height adjustment device is situated on the base frame to pivot the lower scissor relative to the base frame, the height adjustment device including an electrical linear drive, the linear drive being connected to a sled, which is mounted for translational displacement on the base frame, the sled being displaceable by the linear drive from a park position into a lift position,
(Continued)

the sled being connected to the lower scissor via a tension spring to initiate a pivoting movement of the lower scissor into a raised position.

18 Claims, 4 Drawing Sheets

(51) Int. Cl.
*B60L 5/19* (2006.01)
*B60L 5/22* (2006.01)
*B60L 5/24* (2006.01)
*B60L 5/28* (2006.01)

(52) U.S. Cl.
CPC .................. *B60L 5/24* (2013.01); *B60L 5/28* (2013.01); *B60L 2200/36* (2013.01)

(58) Field of Classification Search
USPC ........................................................... 191/64
See application file for complete search history.

(56) References Cited

U.S. PATENT DOCUMENTS

| | | | | |
|---|---|---|---|---|
| 2016/0257205 | A1* | 9/2016 | Wang | B60L 5/18 |
| 2018/0236885 | A1* | 8/2018 | Gamsjäger | B60L 53/32 |
| 2019/0105989 | A1* | 4/2019 | Pachler | B60L 5/30 |

FOREIGN PATENT DOCUMENTS

| | | | | | |
|---|---|---|---|---|---|
| CN | 111660819 | A | * | 9/2020 | B60L 5/30 |
| DE | 102009030218 | B3 | * | 9/2010 | B60L 5/19 |
| DE | 202014007218 | U1 | * | 10/2014 | B60L 5/30 |
| DE | 102016223051 | A1 | | 5/2018 | |
| EP | 0112265 | B1 | * | 3/1987 | B60L 5/28 |
| ES | 2557814 | T3 | * | 1/2016 | B60L 5/19 |
| WO | WO-2020093775 | A1 | * | 5/2020 | B60L 5/20 |

* cited by examiner

CURRENT COLLECTOR SYSTEM AND METHOD

CROSS-REFERENCE TO RELATED APPLICATIONS

This application is a bypass continuation-in-part of International Patent Application No. PCT/DE2022/100227 (filed 25 Mar. 2022), which claims priority to German Patent Application No. 10 2021 107 676.5 (filed 26 Mar. 2021), the entire disclosures of which are incorporated herein by reference.

BACKGROUND

Technical Field

Embodiments of the subject matter described herein relate to a current collector system and associated method.

Discussion Of Art

Current collectors may be used in multiple transportation modes. For example, these collectors may be used in rail and non-rail construction machines. Current collectors have found use in vehicles for above-ground surface mining. Such current collectors may have a vehicle-mounted base frame, which may be fastened on a driver's cab of a truck. A lower scissor may connect to an upper scissor and can be fastened to the base frame. The upper scissor and the current collector rocker are guided on the upper scissor via steering rods. The current collector rocker includes contact strips for contacting an energized overhead line. The current collector may be raised by an electromechanical or also fluid-mechanical height adjustment on the base frame.

It may be desirable to have a current collector that differs from those that are currently available.

Brief Description

In one example, a current collector system can include a lower scissor that may be fastened on a base frame that is mounted on a vehicle, an upper scissor that may be fastened on the lower scissor with steering rods, and a current collector rocker that can be fastened on the upper scissor. The current collector rocker may include contact strips for contacting an energized overhead line. The system also may include a height adjustment device situated on or in the base frame. The height adjustment device may include an electrical linear drive and may pivot the lower scissor with respect to the base frame. The system also may include a sled connected to the linear drive of the height adjustment device and connected to the lower scissor via a tension spring. The sled may be displaced by the linear drive from a park position into a lift position. The system also may include a spindle connected to the sled and may be linearly displaceable by the linear drive. The sled can be translationally displaceable to the base frame by operation of the linear drive on the spindle.

In another example, another current collector system may include scissors that can be coupled with a vehicle, and a current collector rocker fastened on the scissors. The current collector rocker may engage a conductive pathway that is off-board the vehicle. The system also may include a height adjustment device that can pivot at least one of the scissors with respect to the vehicle, and a sled connected to the height adjustment device and connected to the at least one of the scissors. The sled may be moved by the height adjustment device from a lower position into a raised position. The system also can include a spindle connected to the sled that may be moved by the height adjustment device. The sled may be moved toward the vehicle by operation of the height adjustment device on the spindle.

In another example, another current collector system may include a lower scissor that can be fastened on a base frame that is mounted on a vehicle. The lower scissor may be fastened to the base frame by one or more first tension springs. The system also can include an upper scissor fastened on the lower scissor with steering rods, and a current collector rocker fastened on the upper scissor. The current collector rocker may include contact strips for contacting an energized overhead line. The system also can include a height adjustment device situated on or in the base frame. The height adjustment device may include an electrical linear drive and can pivot the lower scissor with respect to the base frame. The height adjustment device can lower the current collector rocker. The system also may include a sled connected to the linear drive of the height adjustment device and connected to the lower scissor via a second tension spring. The sled may be displaceable by the linear drive from a park position into a lift position. The one or more first tension springs can assist pivoting movement of the lower scissor into the lift position. The system may include a spindle connected to the sled and that can be linearly displaceable by the linear drive. The sled may be translationally displaceable to the base frame by operation of the linear drive on the spindle.

BRIEF DESCRIPTION OF THE DRAWINGS

The subject matter described herein is explained below with reference to an example embodiment represented in purely schematic drawings, in which.

DETAILED DESCRIPTION

Figure 1:
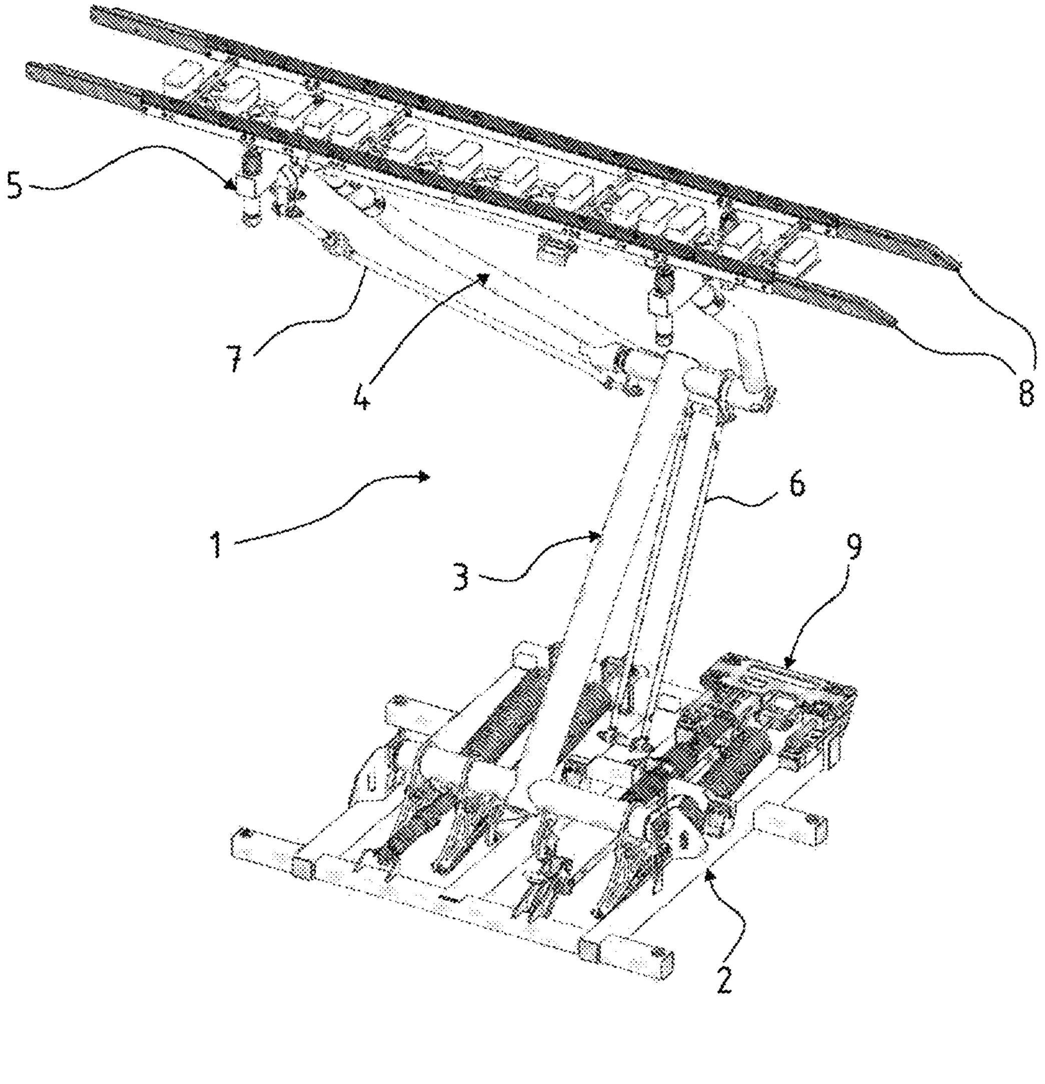
FIG. 1 shows a current collector in a perspective view in the raised state.

Embodiments of the subject matter described herein relate to a current collector system and associated method of operation. The current collector system may include a vehicle-mounted base frame and may include a lower scissor fastened on the base frame and an upper scissor fastened to the lower scissor. The system may include steering rods that operate to guide the scissor(s). A current collector rocker may be fastened on the upper scissor. Contact strips of the current collector rocker may be provided for contacting an off-board power source (e.g., a source or conveyor of electric energy that is off-board the vehicle, such as an energized overhead line, an electrified rail, or another conductive pathway). A height adjustment device may be arranged on the base frame. The device may pivot the lower scissor with respect to the base frame.

The height adjustment device may include an electrical linear drive. The linear drive may connect to a sled, which may be mounted for translational displacement on the base frame. Suitable linear drives may include an electric motor. Suitable motors may include alternating current (AC) motors and direct current (DC) motors. The motors may be rotary (with required gearing) or may be linear. Suitable motors may be brushed DC or have a commutator. A suitable motor may be an induction motor or a synchronous motor. The motor type, size, voltage, torque, and rating may be selected with reference to application specific requirements.

The sled may be displaceable from a park position into a lift position by the linear drive. The lift position corresponds to the raised position of the lower scissor. The park position corresponds to the lowered position of the lower scissor. The sled may be connected to the lower scissor via a tension spring to initiate a pivoting movement of the lower scissor into the raised position.

In an embodiment, the height adjustment may be affected solely by electrical means, such as by supply of electric energy. The current collector may be devoid of fluid media (e.g., the height adjustment may be electronically, but not pneumatically, controlled). In the case of mining vehicles, no media-conducting lines may be disposed within the area of the roof in which the base frame may be fastened. Top loading of the mining vehicle may have a relatively reduced chance of damaging the media-conducting lines if they are so located. Embodiments may reduce or prevent groundwater seepage from endangering media. The water being able to escape the area adjacent to the current collector.

The linear drive may connect to a sled. The sled in turn may be coupled to the lower scissor via a tension spring. In one example, the sled may not directly connect to the lower scissor, but only indirectly connect with the lower scissor via the at least one tension spring. Thus, the raising of the lower scissor may take place via the force exerted by the tension spring, or springs, and not by the direct force of the linear drive. The pulling direction of the tension spring may differ from the longitudinal direction of the linear drive. The tension spring and the linear drive may be situated next to one another.

A suitably translationally displaceable sled may be linearly displaceable. For example, the sled may be moveable back and forth from initial position to secondary position, and then back to the initial position, including partial movement or traversal between (but not entirely to) either the secondary position or the initial position. In some embodiments, the trajectory of the sled may not be limited to linear movement. A suitable sled may be guided on a curved trajectory. The direction of movement of the sled may be selected with reference to application specific requirements and does not have to coincide with the orientation of the tension spring. The sled movement may not coincide with the orientation of the linear drive. The respective connection to the tension spring and to the linear drive may be articulated.

The base frame may have a relatively low structural height. The sled may be displaced in parallel to the base frame. The linear drive may fasten horizontally on the base frame. The base frame may mount essentially horizontally and the upper and lower scissors may be raised essentially vertically. In this sense, a horizontally displaceable sled may have a relatively low overall height. The sled may be located on the upper side of the base frame.

The tension spring may raise the lower scissor. As the main tension spring, the tension spring may be assisted by one or more additional supplemental tension springs. The supplemental tension springs may be situated on the base frame and may connect to the lower scissor. When the first tension spring has been tensioned by means of the sled, an initial force may be exerted on the lower scissor. This force may cause an initial movement of the lower scissor. A major portion of the lifting force for raising the current collector rocker may be applied by the supplemental tension springs. For example, two to four tension springs may be connected in parallel. In one embodiment, a total of three tension springs are used. When the tension spring has been stretched and, as a result, exerts an increased force or a torque on the lower scissor, this initial force may be great enough, together with the supplemental tensioning springs, to raise the entire current collector rocker. When the one tension spring relaxes—by the sled being moved into its initial position—the entire current collector may move into the lowered position. This movement may be done against the force of the additional tension springs which, in this case, reduce the lowering speed.

The rapid lowering of the current collector may be essential for an emergency operation, for example, in the event of a disruption in the area of the overhead line or if the power supply on board the motor vehicle fails. To hold the current collector in the raised position, it may be necessary to keep the sled in the extended position. The electrical linear drive may be blocked, for example, by a braking device. The braking device may be electrically operated. Electrical operation may use an electric motor. If the power fails, the brake opens the braking device, and the electrical linear drive may retract. For this purpose, a linear drive including a non-self-locking spindle may be used. If the spindle may be retracted or the brake may be released, the electric linear drive may be able to release the sled, so that the sled enters the park position, and the current collector may be lowered.

To reduce the chance of, or prevent, the current collector from being suddenly lowered when the sled retracts, a damping element between the base frame and the lower scissors may be used. The damping element may be effective in reducing the lowering speed of the lower scissor during a lowering action. A damping element operating in two movement directions could reduce the lifting speed of the current collector. During the operation of the current collector, the damping element may reduce vertical vibrations in the current collector.

The sled may be displaceable relative to the base frame. Either at least one linear bearing may be located on at least one of the guide rails, which may be connected to the base frame, or the sled may include at least one guide rail. The guide rail may be mounted in at least one linear bearing on the base frame.

In one embodiment, multiple linear bearings may be provided either on the base frame and/or on the sled. In this way, it may be possible to absorb torques engaging the sled. The sled may be mounted on two guide rails of the base frame spaced apart from one another. In the case of two linear bearings per guide rail, the sled may be mounted at four points. The linear bearings may be able to absorb forces from multiple spatial directions. In one embodiment, via the guide rails, the sled has only a single degree of freedom, namely, the translational displacement in the direction of the guide rails.

In one aspect, the springs and the linear drive may be situated between the guide rails and connect thereto the sled. Guide rails that may be situated spaced further apart than the springs and the linear drive may be stressed with weaker forces as a result and may be smaller and therefore also lighter for reducing the overall weight of the motor vehicle, thereby increasing the useful weight of the motor vehicle. A shorter distance of the tension springs from the linear drive may generate lower torques in the sled. Only weaker forces must then be absorbed by the guide rails and by the sled. In one embodiment, plural springs may be nested within each other such that as the sled extends additional springs are engaged. In this way, the tension increases as the distance increases. The reverse may be used, too. In this way, the force of the tension over the distance of the translational path of the sled may be selected to achieve a desired movement and speed profile.

The sled may be displaceable in parallel to the base frame from the park position into the lift position. The arrangement parallel to the base frame makes it possible to move the sled even when the current collector been lowered. The sled may have a very small overall height and need not necessarily be located above guide rails of the base frame, but may, in terms of the vertical height, may be situated primarily between the guide rails in one embodiment. The sled has a function of transferring the force of the electrical linear drive onto the tension springs. The lift position of the sled may be located at the same height as the park position of the sled, i.e., at the same distance to the base frame.

The sled may be connected to a detent. The detent, in the lowered position, may engage the lower scissor, the upper scissor or the current collector rocker. The current collector may be locked in the lowered position and may be unable to automatically open, for example, when driving over a bump. By displacing the sled from the park position into the lift position, the detent may be disengaged from the lower scissor, the upper scissor, or the current collector rocker. The sled initiates the lift movement and has the function of actuating a detent. Actuating means that the detent may be disengaged or engaged by the sled. There may be an active connection between sled and detent. The detent may include transmission elements such as, for example, a pivotal hook, which may be connected to the sled via a push rod.

The tension spring may be connected to a tensioning means, which may be guided on a cam disk. The cam disk may be situated on the lower scissor or on a cross member of the lower scissor. As a result of the cam disk, the lever arm for transferring the force onto the lower scissor in the lowered state may be short and increases continuously until the current collector may in the raised position. Connectors such as chains, cables, or the like, may be suitable as tensioning means. Additional tensioning means may be bendable about its longitudinal axis, and may be guided on a cam disk.

The current collector according to embodiments of the invention may be suitable for use on a non-rail-bound vehicle. The current collector may be used on a mining truck. Mining trucks may transport large amounts of bulk materials.

With reference to FIG. 1, a current collector 1 is shown with a base frame 2, which may be fastened on a vehicle not further depicted. It may be fastened, for example, in the roof area of a non-rail-bound vehicle. A lower scissor 3 may be mounted for pivotal movement on base frame. The lower scissor may connect to an upper scissor 4. The upper scissor may carry a current collector rocker 5. The steering rods 6, 7 may guide the upper scissor and the current collector rocker, respectively.

The current collector rocker may have one or more contact strips 8. The contact strips may contact an energized overhead line (not further depicted). The contact strips may be connected via electrical lines to the motor vehicle (not further depicted).

Figure 2:
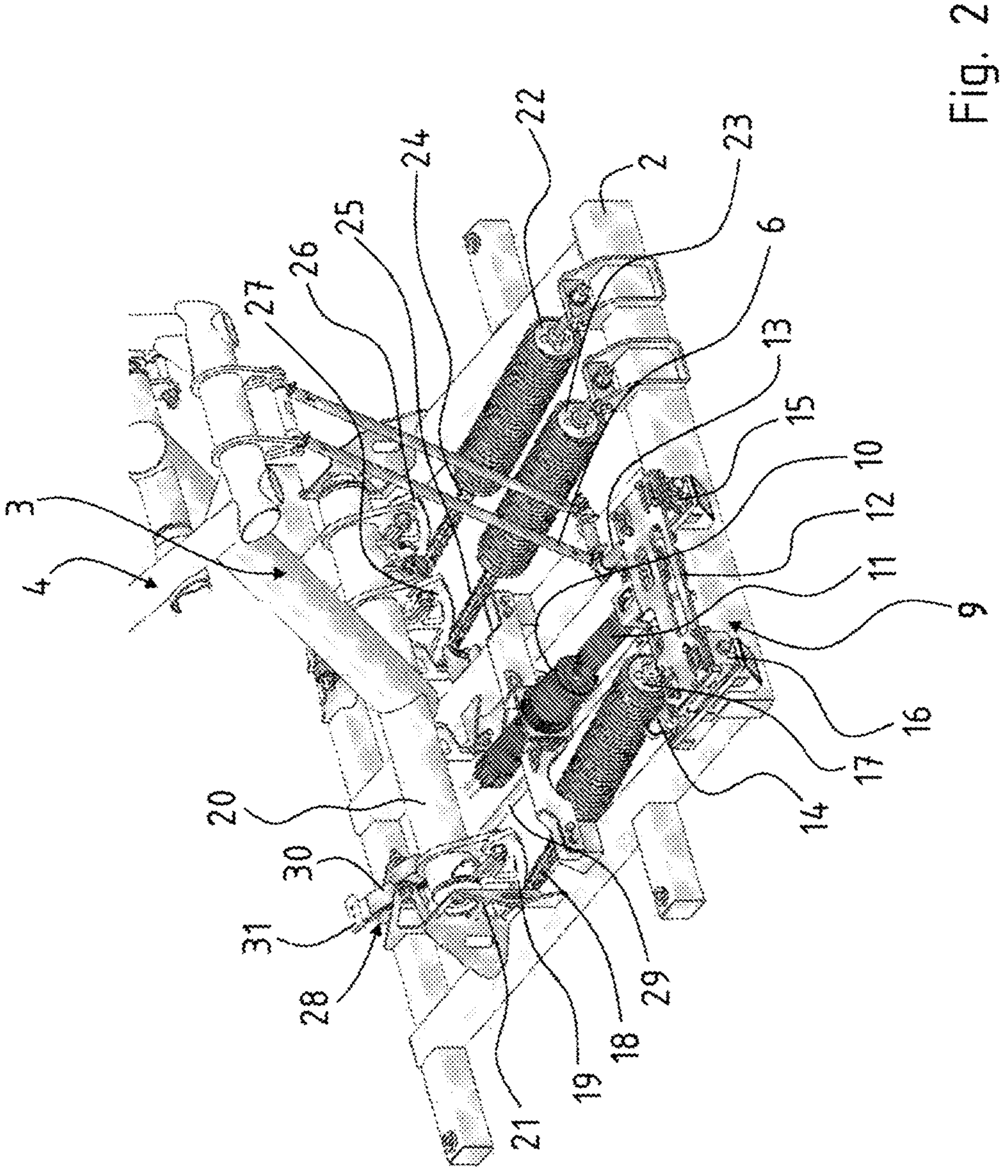
FIG. 2 shows a perspective view of the base frame of the raised current collector of FIG. 1.
Figure 3:
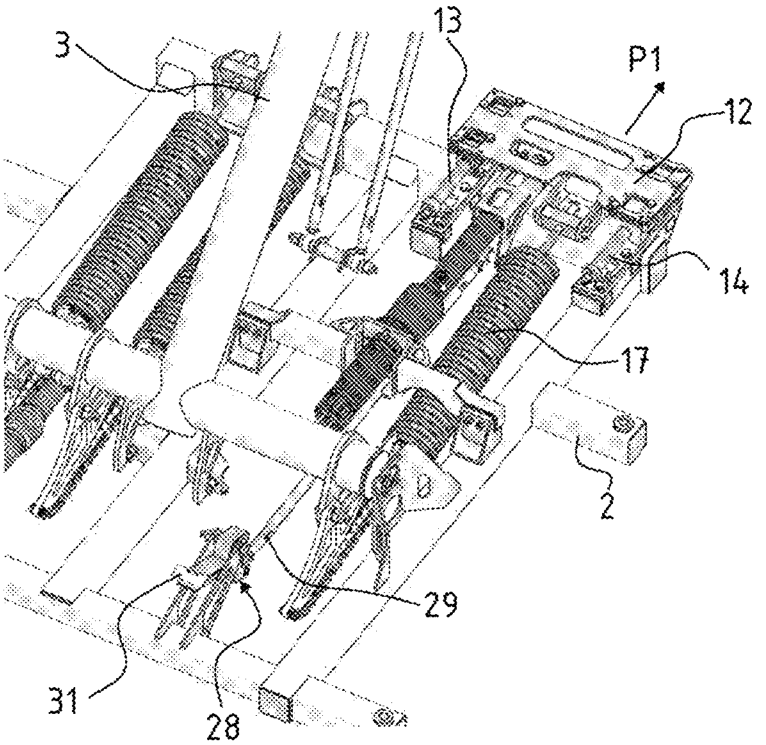
FIG. 3 shows a further perspective view of the base frame of the raised current collector of FIG. 1.
Figure 4:
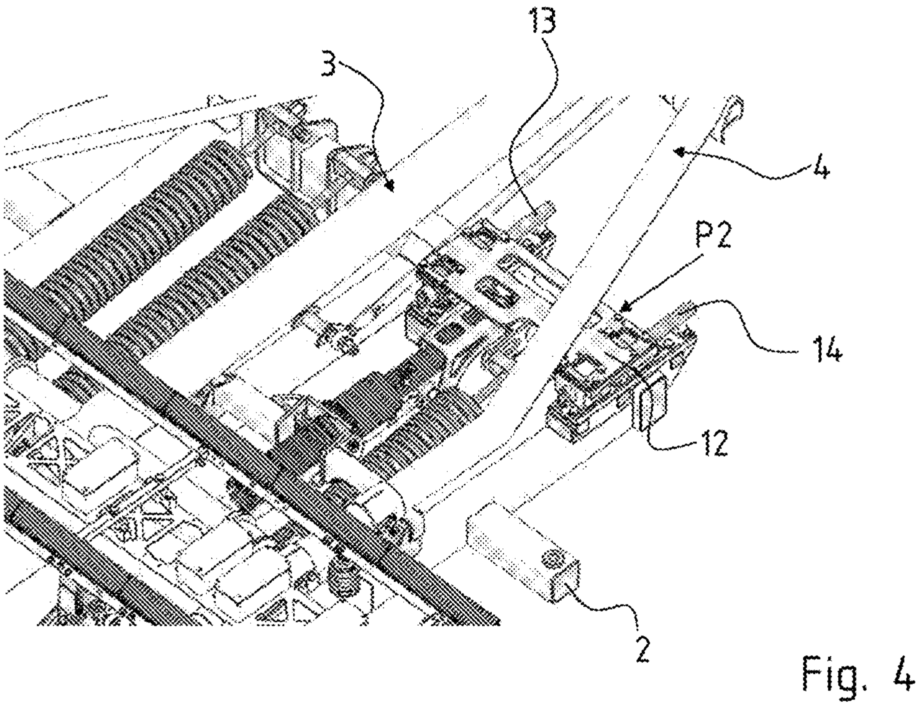
FIG. 4 shows a perspective view of the current collector of FIG. 1 in a lowered position.

A height adjustment device 9, which may include multiple components (FIG. 2), may be situated on the base frame. The height adjustment device may include an electrical linear drive 10 as the central drive element. A spindle 11 may be linearly displaced by a drive motor. The spindle may be connected at its free end to a sled 12. The sled may be mounted on base frame 2. The sled may be translationally displaceable. Arrows P1 and P2 in FIGS. 3 and 4 show the direction of movement. The sled may be guided via two guide rails 13, 14, which extend in parallel to the upper side of base frame and may be connected to base frame. Guide rails may be encompassed by two linear bearings 15, 16, which may be connected to the sled. The sled may be able to be continuously adjusted between a park position and a lift position. FIG. 2 shows the lift position. In the lift position, lower scissor and thus current collector may be raised.

The sled may be connected to a tension spring 17. The tension spring in turn may be connected to a tensioning means 18 in the form of a link chain. The tensioning means abuts a cam disk 19 and may be connected at its end to the cam disk. The cam disk may be connected to a lower cross member 20 of the lower scissor. The cross member may be mounted for pivotable movement via a bearing 21 on the base frame. When the sled has been displaced into the lift position shown in FIG. 2, the tension spring may be entrained and may be stretched. The tensioning means may exert a pulling force on the cam disk, as a result of which the cross member may pivot and the current collector rocker may be raised.

The pivotal movement may be assisted by additional supplemental tension springs 22, 23. These additional supplemental tension springs may be connected via additional tensioning means 24, 25 and additional cam disks 26, 27 to the cross-member. They may assist the first tension spring.

FIGS. 2 and 3 show a detent 28, which may be actuated via the sled. The detent includes a rod 29. The rod may be connected to a pivot lever 30 mounted on the base frame. The base frame may include a detent hook 31 at its free end. The detent hook is shown in the representation of FIGS. 2 and 3 in an open position.

Figure 5:
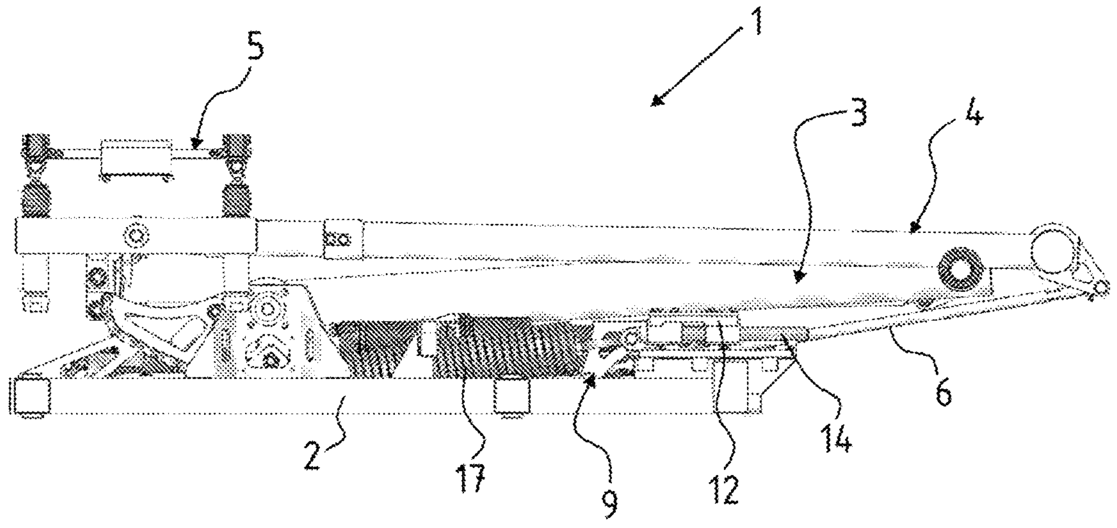
FIG. 5 shows the current collector of FIGS. 1 through 4 in a lowered position in a side view.
Figure 6:
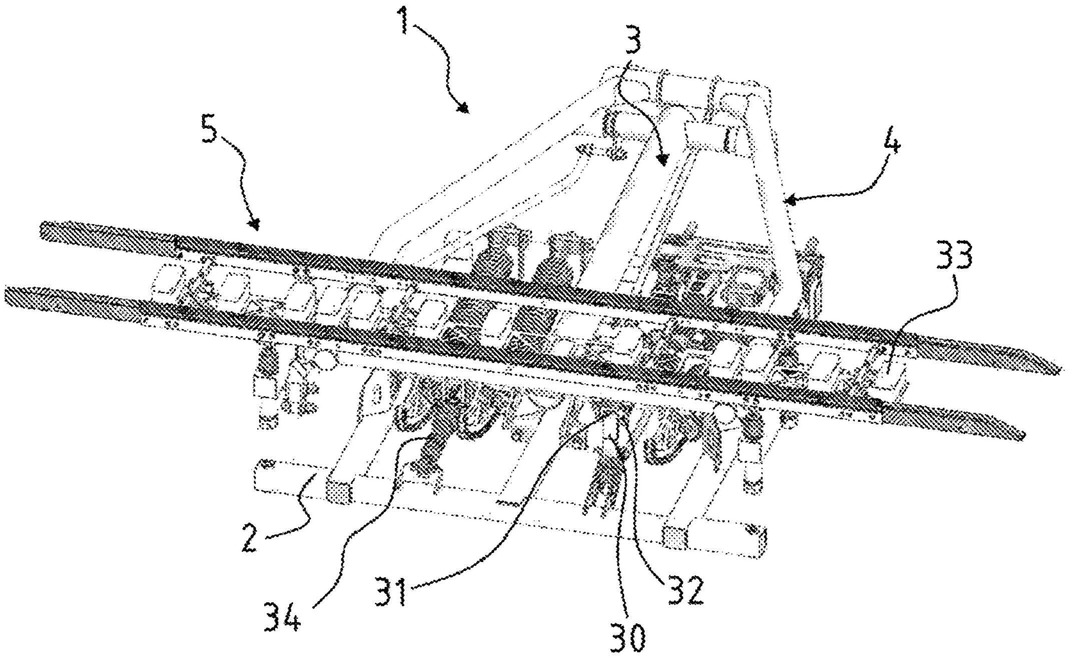
FIG. 6 shows the current collector of FIGS. 1 through 5 in a perspective view in the lowered position.

FIGS. 4 through 6 show the current collector of FIG. 1 in the lowered position of the current collector rocker. From the representation of FIG. 6, the pivot lever has been pivoted into a locking position, and that as a result the detent hook catches in a detent hook receptacle 32 on the underside of the current collector rocker. The pivot lever has been displaced into the locking position by the rod because the sled is located in a park position. The views of FIGS. 3 and 4 show the different sled positions. The guide rails in the representation of FIG. 3, i.e., in the raised position of the current collector rocker, protrude with respect to the sled on the side facing the tension spring. In the lowered position as shown in FIG. 4, the other ends of the guide rails protrude with respect to the sled. FIG. 5 shows a side view of how compact the current collector may be in the lowered position. In one embodiment, the current collector may be lowered to an overall height of, for example, less than about 650 mm. The minimum operating height may be at 1 meter, and may reach up to approximately 2,650 mm, as measured from the lower edge of the base frame.

From the representation of FIG. 6, the current collector rocker may include a detection system 33 for detecting the position of an overhead line. The detection system may be able to detect the position of the overhead line. This may be in a non-rail-bound vehicle and, as result of the position detection a controller may signal the driver to correct the driving direction. In another embodiment, the controller may signal a vehicle controller to correct the driving direction in an automated manner.

The height adjustment may be provided with a damping effect, so that in the case of an electrical power failure, the current collector rocker does not descend too rapidly, but rather lowers in a controlled manner. A damping element 34 (FIG. 6) may be operative between the base frame and the lower scissor. It may be situated below the cross-member of the lower scissor.

In one example, a current collector system can include a lower scissor that may be fastened on a base frame that is mounted on a vehicle, an upper scissor that may be fastened on the lower scissor with steering rods, and a current collector rocker that can be fastened on the upper scissor. The current collector rocker may include contact strips for contacting an energized overhead line. The system also may include a height adjustment device situated on or in the base frame. The height adjustment device may include an electrical linear drive and may pivot the lower scissor with respect to the base frame. The system also may include a sled connected to the linear drive of the height adjustment device and connected to the lower scissor via a tension spring. The sled may be displaced by the linear drive from a park position into a lift position. The system also may include a spindle connected to the sled and may be linearly displaceable by the linear drive. The sled can be translationally displaceable to the base frame by operation of the linear drive on the spindle.

The tension spring may be a first tension spring, and the system also can include at least a second tension spring situated on the base frame and connected to the lower scissor. The second tension spring may assist pivoting movement of the lower scissor into the lift position. The height adjustment device may include an electrical blocking device configured to release the sled in an event of a power failure to enter the sled into the park position and lower the current collector rocker. The blocking device may be engaged with the electrical linear drive.

The system also may include a damping element between the base frame and the lower scissor that may slow a lowering speed of the lower scissor during lowering of the lower scissor. The sled may include at least one guide rail configured to be mounted in at least one linear bearing on the base frame. The sled may be mounted to the base frame via at least one linear bearing on at least one guide rail. The sled may be mounted on guide rails of the base frame that are spaced apart from each other. The linear drive and the tension spring may be connected to the sled between the guide rails.

The sled may be displaced from the park position into the lift position in parallel to the base frame. The sled may be operatively connected to a detent which, while the sled in the park position, may engage the lower scissor, the upper scissor, or the current collector rocker, and the detent may be disengaged from the lower scissor by displacement of the sled from the park position to the lift position.

The tension spring may be connected to a connector guided on a cam disk. The lower scissor may be mounted on a non-rail vehicle.

In another example, another current collector system may include scissors that can be coupled with a vehicle, and a current collector rocker fastened on the scissors. The current collector rocker may engage a conductive pathway that is off-board the vehicle. The system also may include a height adjustment device that can pivot at least one of the scissors with respect to the vehicle, and a sled connected to the height adjustment device and connected to the at least one of the scissors. The sled may be moved by the height adjustment device from a lower position into a raised position. The system also can include a spindle connected to the sled that may be moved by the height adjustment device. The sled may be moved toward the vehicle by operation of the height adjustment device on the spindle.

The sled can be connected to the at least one of the scissors by one or more tension springs. The height adjustment device may release the sled responsive to a power failure and move the sled to the lower position. The system also may include a damping element that can be disposed between the vehicle and the scissors. The damping element may slow a lowering speed of the at least one of the scissors during lowering of the at least one of the scissors.

In another example, another current collector system may include a lower scissor that can be fastened on a base frame that is mounted on a vehicle. The lower scissor may be fastened to the base frame by one or more first tension springs. The system also can include an upper scissor fastened on the lower scissor with steering rods, and a current collector rocker fastened on the upper scissor. The current collector rocker may include contact strips for contacting an energized overhead line. The system also can include a height adjustment device situated on or in the base frame. The height adjustment device may include an electrical linear drive and can pivot the lower scissor with respect to the base frame. The height adjustment device can lower the current collector rocker. The system also may include a sled connected to the linear drive of the height adjustment device and connected to the lower scissor via a second tension spring. The sled may be displaceable by the linear drive from a park position into a lift position. The one or more first tension springs can assist pivoting movement of the lower scissor into the lift position. The system may include a spindle connected to the sled and that can be linearly displaceable by the linear drive. The sled may be translationally displaceable to the base frame by operation of the linear drive on the spindle.

The sled may include at least one guide rail that can be mounted in at least one linear bearing on the vehicle. The sled can be operatively connected to a detent which, while the sled in the park position, engages the lower scissor, the upper scissor, or the current collector rocker, and the detent can be disengaged from the lower scissor by displacement of the sled from the park position to the lift position.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A current collector system, comprising:

a lower scissor configured to be fastened on a base frame that is mounted on a vehicle;

an upper scissor fastened on the lower scissor with steering rods;

a current collector rocker fastened on the upper scissor, the current collector rocker including contact strips for contacting an energized overhead line and a detent hook receptacle on a side of the current collector rocker opposite the contact strips;

a height adjustment device situated on or in the base frame, the height adjustment device including an electrical linear drive and configured to pivot the lower scissor with respect to the base frame;

a sled connected to the linear drive of the height adjustment device and connected to the lower scissor via a tension spring, the sled being displaceable by the linear drive from a park position into a lift position;

a detent situated on the base frame and actuatable by the sled, wherein the detent comprises:

a rod;

a detent hook; and a pivot lever coupled to the rod at one end and the detent hook at an opposite end, wherein the detent hook engages with the detent hook receptacle in a locking position; and a spindle connected to the sled and configured to be linearly displaceable by the linear drive, wherein the sled is translationally displaceable to the base frame by operation of the linear drive on the spindle.

2. The current collector system according to claim 1, wherein the tension spring is a first tension spring, and further comprising at least a second tension spring situated on the base frame and connected to the lower scissor, the at least the second tension spring configured to assist pivoting movement of the lower scissor into the lift position.

3. The current collector system according to claim 1, wherein the height adjustment device includes an electrical blocking device configured to release the sled in an event of a power failure to enter the sled into the park position and lower the current collector rocker.

4. The current collector system according to claim 3, wherein the electrical blocking device is engaged with the electrical linear drive.

5. The current collector system according to claim 1, further comprising:

a damping element between the base frame and the lower scissor that is configured to slow a lowering speed of the lower scissor during lowering of the lower scissor.

6. The current collector according to claim 1, wherein the sled includes at least one guide rail configured to be mounted in at least one linear bearing on the base frame.

7. The current collector system according to claim 1, wherein the sled is configured to be mounted to the base frame via at least one linear bearing on at least one guide rail.

8. The current collector system according to claim 7, wherein the sled is configured to be mounted on guide rails of the base frame that are spaced apart from each other.

9. The current collector system according to claim 8, wherein the linear drive and the tension spring are configured to be connected to the sled between the guide rails.

10. The current collector system according to claim 1, wherein the sled 1*s* configured to be displaced from the park position into the lift position in parallel to the base frame.

11. The current collector system according to claim 1, wherein the tension spring is connected to a connector guided on a cam disk.

12. The current collector system according to claim 1, wherein the lower scissor is configured to be mounted on a non-rail vehicle.

13. A current collector system, comprising:

scissors configured to be fastened on a base frame configured to be coupled with a vehicle;

a current collector rocker fastened on the scissors, the current collector rocker configured to engage a conductive pathway that is off-board the vehicle and a detent hook receptacle on a side of the current collector rocker opposite a contact strip;

a height adjustment device configured to pivot at least one of the scissors with respect to the vehicle;

a sled connected to the height adjustment device and connected to the at least one of the scissors, the sled configured to be moved by the height adjustment device from a lower position into a raised position;

a detent situated on the base frame and actuatable by the sled, wherein the detent comprises:

a rod;

a detent hook; and a pivot lever coupled to the rod at one end and the detent hook at an opposite end, wherein the detent hook engages with the detent hook receptacle in a locking position; and a spindle connected to the sled and configured to be moved by the height adjustment device, the sled configured to be moved toward the vehicle by operation of the height adjustment device on the spindle.

14. The current collector system of claim 13, wherein the sled is connected to the at least one of the scissors by one or more tension springs.

15. The current collector system of claim 13, wherein the height adjustment device is configured to release the sled responsive to a power failure and move the sled to the lower position.

16. The current collector system of claim 13, further comprising:

a damping element configured to be disposed between the vehicle and the scissors, the damping element configured to slow a lowering speed of the at least one of the scissors during lowering of the at least one of the scissors.

17. The current collector system of claim 16, wherein the sled includes at least one guide rail configured to be mounted in at least one linear bearing on the vehicle.

18. A current collector system, comprising:

a lower scissor configured to be fastened on a base frame that is mounted on a vehicle, the lower scissor configured to be fastened to the base frame by one or more first tension springs;

an upper scissor fastened on the lower scissor with steering rods;

a current collector rocker fastened on the upper scissor, the current collector rocker including contact strips for contacting an energized overhead line;

a height adjustment device situated on or in the base frame, the height adjustment device including an electrical linear drive and configured to pivot the lower scissor with respect to the base frame, the height adjustment device configured to lower the current collector rocker;

a sled connected to the linear drive of the height adjustment device and connected to the lower scissor via a second tension spring, the sled being displaceable by the linear drive from a park position into a lift position, the one or more first tension springs configured to assist pivoting movement of the lower scissor into the lift position;

a detent hook receptacle on a side of the current collector rocker opposite the contact strips; and a detent situated on the base frame and actuatable by the sled, wherein the detent comprises:

a rod;

a detent hook; and a pivot lever coupled to the rod at one end and the detent hook at an opposite end, wherein the detent hook engages with the detent hook receptacle in a locking position;

the height adjustment device is configured to release the sled responsive to a power failure and move the sled to the lower position;

a damping element configured to be disposed between the base frame and the scissors, the damping element configured to slow a lowering speed of the at least one of the scissors responsive to the power failure; and a spindle connected to the sled and configured to be linearly displaceable by the linear drive, wherein the sled is translationally displaceable to the base frame by operation of the linear drive on the spindle.

* * * * *